US008463235B1

(12) United States Patent
Antonov et al.

(10) Patent No.: US 8,463,235 B1
(45) Date of Patent: Jun. 11, 2013

(54) PROTECTION FROM TELEPHONE PHISHING

(75) Inventors: Vadim Antonov, Belmont, CA (US); Kirill Levichev, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 123 days.

(21) Appl. No.: 12/881,915

(22) Filed: Sep. 14, 2010

(51) Int. Cl.
*H04M 1/66* (2006.01)

(52) U.S. Cl.
USPC ........... 455/410; 455/411; 455/461; 455/551; 455/414.1

(58) Field of Classification Search
USPC .................. 455/410, 411, 461, 551
See application file for complete search history.

(56) References Cited

U.S. PATENT DOCUMENTS

| 2007/0186284 | A1* | 8/2007 | McConnell | 726/25 |
|---|---|---|---|---|
| 2007/0238449 | A1* | 10/2007 | Park et al. | 455/417 |
| 2010/0329140 | A1* | 12/2010 | Buford et al. | 370/252 |

* cited by examiner

*Primary Examiner* — Kamran Afshar
*Assistant Examiner* — Shahriar Behnamian
(74) *Attorney, Agent, or Firm* — Brill Law Office; Jeffrey Brill

(57) ABSTRACT

Attempts to communicate telephonically by a mobile phone are detected. When an attempt is detected, an associated phone number is identified and transmitted to a server in order to glean corresponding security information. On the server, a database is maintained containing 1) phone numbers known to present potential security concerns and 2) descriptive security information concerning each of these phone numbers. The server receives phone numbers from mobile phones to check for security information, searches the database for received phone numbers, and transmits corresponding security information to the originating mobile phones. Security information concerning identified telephone numbers is received from the server by mobile phones. Responsive to the contents of the received security information, detected attempts to communicate telephonically are allowed to processed, blocked or otherwise processed.

20 Claims, 5 Drawing Sheets

PROTECTION FROM TELEPHONE PHISHING

TECHNICAL FIELD

This disclosure pertains generally to computer security, and more specifically to protecting mobile users from telephone phishing.

BACKGROUND

With the wide adoption of Short Message Service ("SMS") for text messaging on mobile phones, as well as the increasing openness of telephone networks, telephone phishing is on the rise. Telephone phishing comprises an attempt to get a user to communicate telephonically with a party whom the user does not know, without accurately reveling that party's true identity or intent, often in an attempt to defraud the user financially or to steal personal information. Telephone phishing frequently takes the form of attempting to get the user to call a premium phone number which results in a charge to the caller and a payment to the phishing party. Another common form of telephone phishing involves getting the user to call a number which plays a recording, asking the user to enter credit card, banking or other financial or personal information under some type of false pretense, such as stating that the message is a security check from the user's financial institution. Other times, telephone phishing is of a more general nature, such as tricking a user into calling an unscrupulous business with which the user does not really wish to communicate, in an attempt to sell the user something such as timeshare property or questionable investments.

These attempts to get a user to call a target number can be made in various ways. One technique is to call a user's phone and let it ring only once, such that the target number is shown on the user's phone as having placed a missed call. Users will sometimes call the number from which the missed call originated out of curiosity, or thinking that the call might have been important. Other techniques involve sending the user voice messages or instant messages directing the user to call the target number under some type of false pretense (e.g., stating that the user has won a prize, or that the user's bank account has been compromised and follow-up action is required). In other instances, phone phishing can be as simple as placing the target number in a spam advertisement or on a (malicious) website, typically offering the user some sort of prize or reward for calling.

Generally, telephone users have no way to ascertain the reputation or legitimacy of the party associated with the target number, if that party is not known to the user. This creates opportunity for criminal activities and unscrupulous business practices such as those described above, which exploit unaware users. It would be desirable to address these issues.

SUMMARY

Users of mobile phones are protected from telephone phishing and other security threats. Attempts to communicate telephonically by a mobile phone are detected. These attempts can include both incoming and outgoing phone calls and text messages. When such an attempt is detected, an associated phone number is identified (i.e., the source or target phone number of the incoming or outgoing communication attempt). Identified phone numbers are transmitted to a server in order to glean corresponding security information concerning the phone number.

On the server, a database is maintained containing 1) phone numbers known to present potential security concerns and 2) descriptive security information concerning each of these phone numbers. The server receives phone numbers from mobile phones to check for security information. In responsive, the database is searched for received phone numbers, and corresponding security information concerning the phone numbers is transmitted to the originating mobile phones. Where a specific phone number is not found in the database, security information indicating that there are no known security threats associated with the specific phone number is transmitted. Where a specific phone number is found in the database, descriptive security information concerning the specific phone number from the database is transmitted.

Thus, security information concerning identified telephone numbers is received from the server by mobile phones. Responsive to the contents of the received security information, detected attempts to communicate telephonically are processed. Where the received security information indicates that there are no known security threats associated with an identified telephone number, the detected attempt to communicate telephonically is allowed to proceed. Where the received security information describes at least one potential security threat associated with a telephone number, the attempt to communicate telephonically can be processed in other ways. For example, the attempt can be blocked, a security warning can be displayed, or user input as to whether or not to proceed can be solicited.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
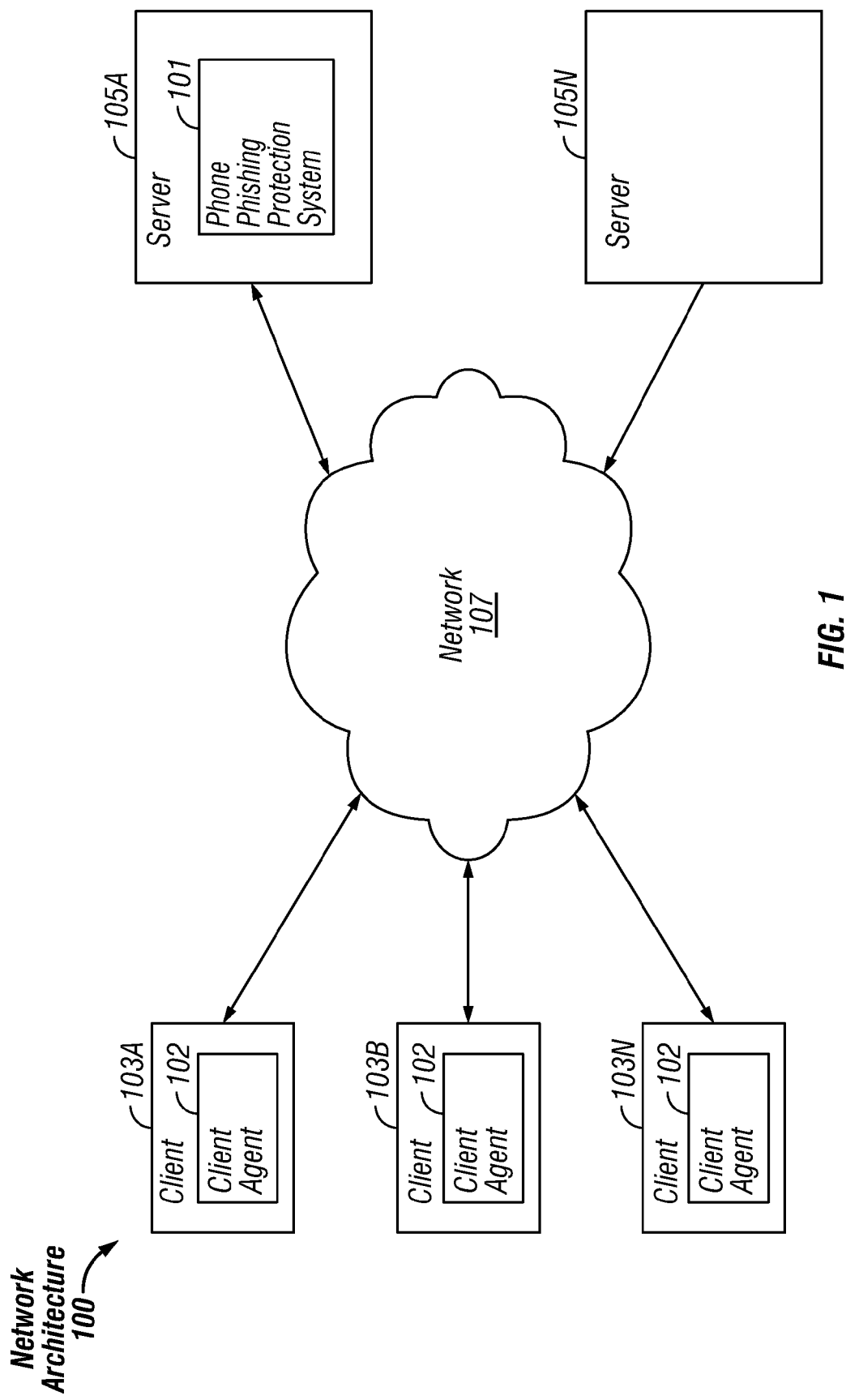
FIG. 1 is a block diagram of an exemplary network architecture in which a phone phishing protection system can be implemented, according to some embodiments.

FIG. 1 is a block diagram illustrating an exemplary network architecture 100 in which a phone phishing protection system 101 can be implemented. The illustrated network architecture 100 comprises multiple mobile phones 103A, 103B and 103N, as well as multiple servers 105A and 105N. In FIG. 1, the phone phishing protection system 101 is illustrated as residing on server 105A, with a client agent 102 thereof on each mobile phone 103. It is to be understood that this is an example only, and in various embodiments various functionalities of this system 101 can be instantiated on a mobile phone 103, a server 105 or can be distributed between multiple computing devices as desired.

It is to be understood that the mobile phones 103 described herein comprises portable computer systems 210 capable of making and receiving phone calls, as well connecting to a network 107 and running applications (such mobile phones 103 are sometimes referred to as smart-phones, but even many mobile phones 103 not so designated have these capabilities). Mobile phones 103 and servers 105 can be implemented using computer systems 210 such as the one illustrated in FIG. 2 and described below. The mobile phones 103 and servers 105 are communicatively coupled to a network 107, for example via a network interface 248 as described below in conjunction with FIG. 2. Mobile phones 103 are able to access applicants and/or data on servers 105 using, for example, a web browser or other client software (not shown).

Although FIG. 1 illustrates three mobile phones 103 and two servers 105 as an example, in practice many more (or fewer) mobile phones 103 and/or servers 105 can be deployed. In one embodiment, the network 107 is in the form of the Internet. Other networks 107 or network-based environments can be used in other embodiments.

Figure 2:
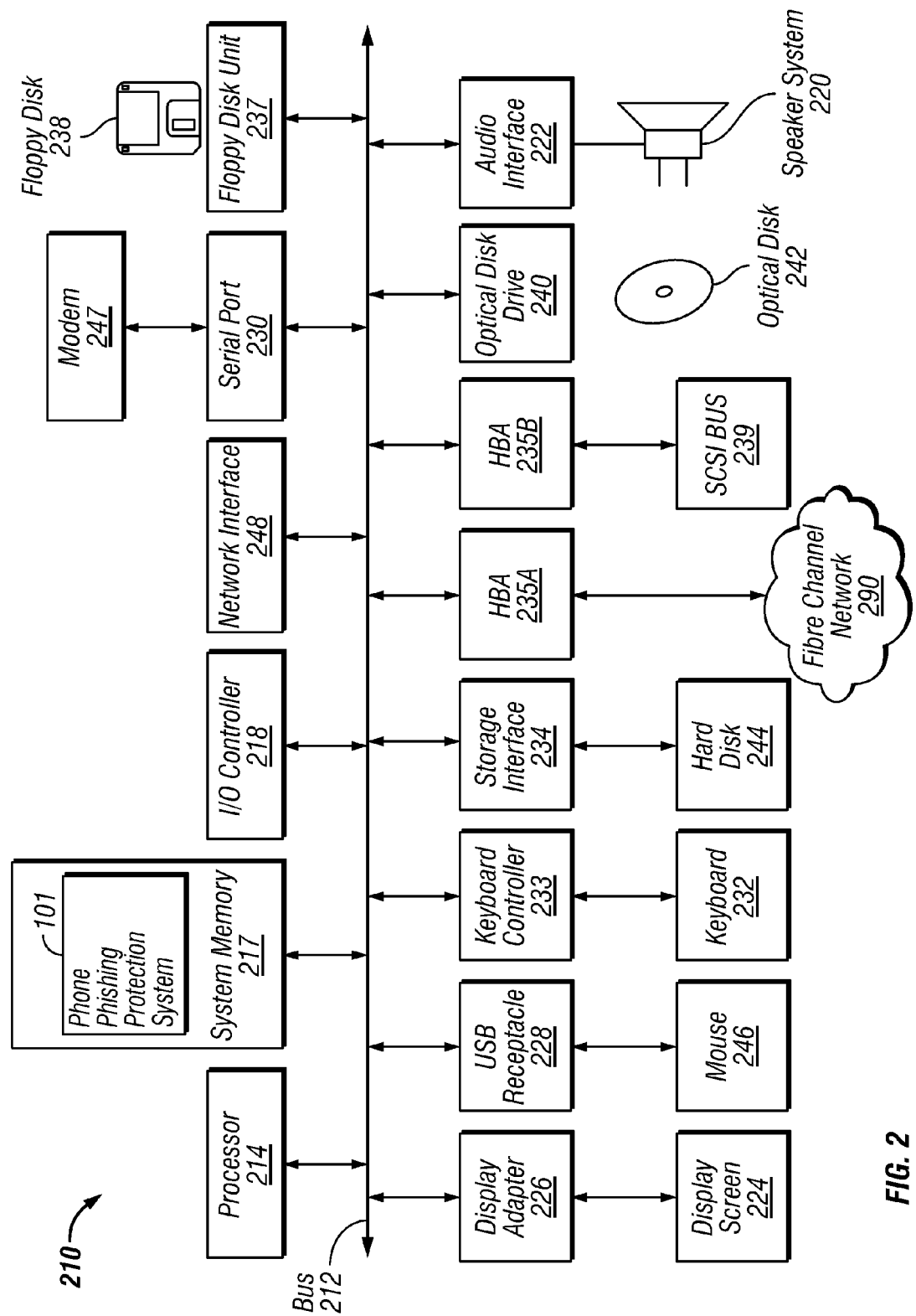
FIG. 2 is a block diagram of a computer system suitable for implementing a phone phishing protection system, according to some embodiments.

FIG. 2 is a block diagram of a computer system 210 suitable for implementing a phone phishing protection system 101. Both mobile phones 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present, and especially in the case of a mobile phone 103, fewer features will often be present. The components can also be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the phone phishing protection system 101 is illustrated as residing in system memory 217. The workings of the phone phishing protection system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
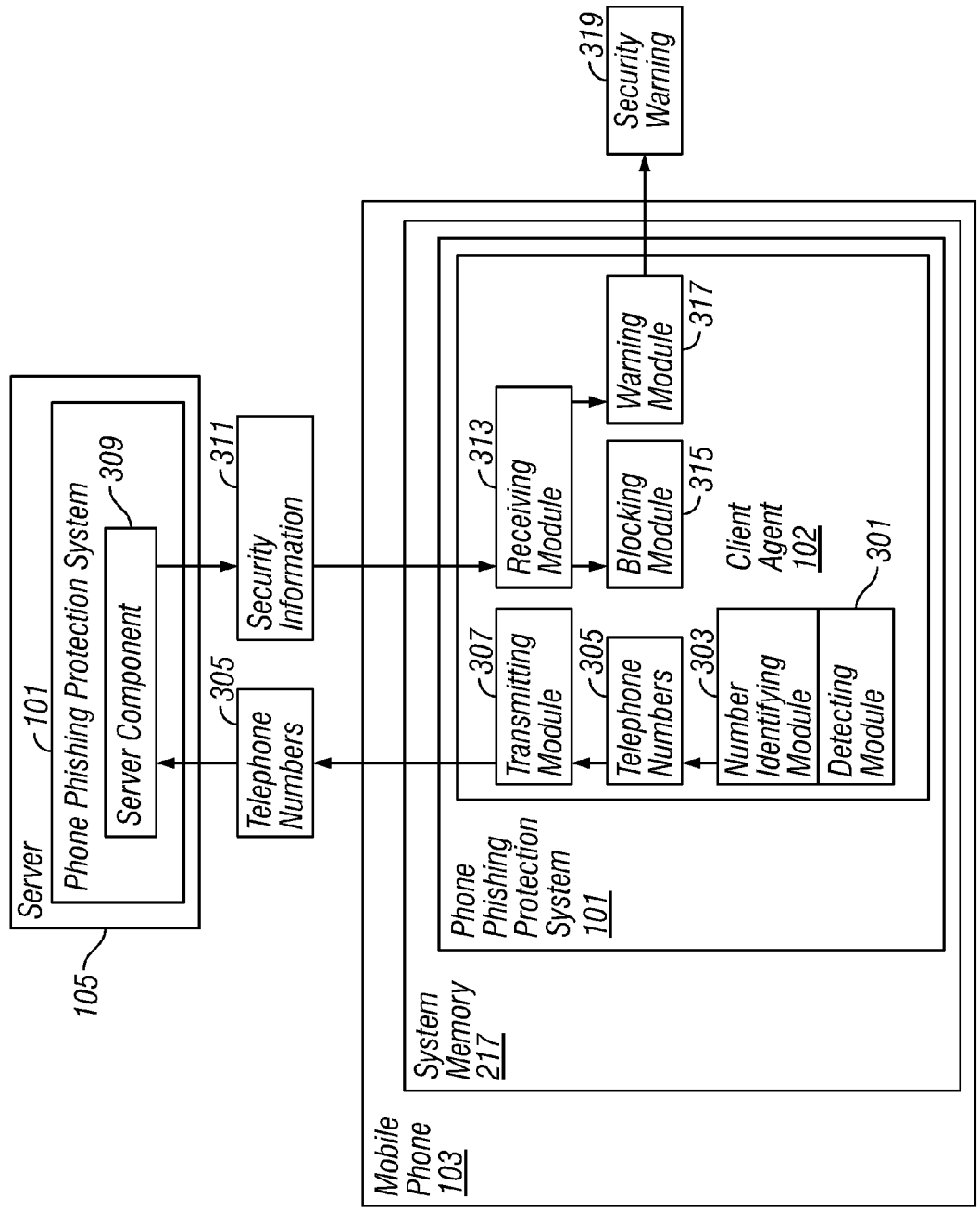
FIG. 3 is a block diagram of the operation of a client agent 102 of a phone phishing protection system, according to some embodiments.
Figure 4:
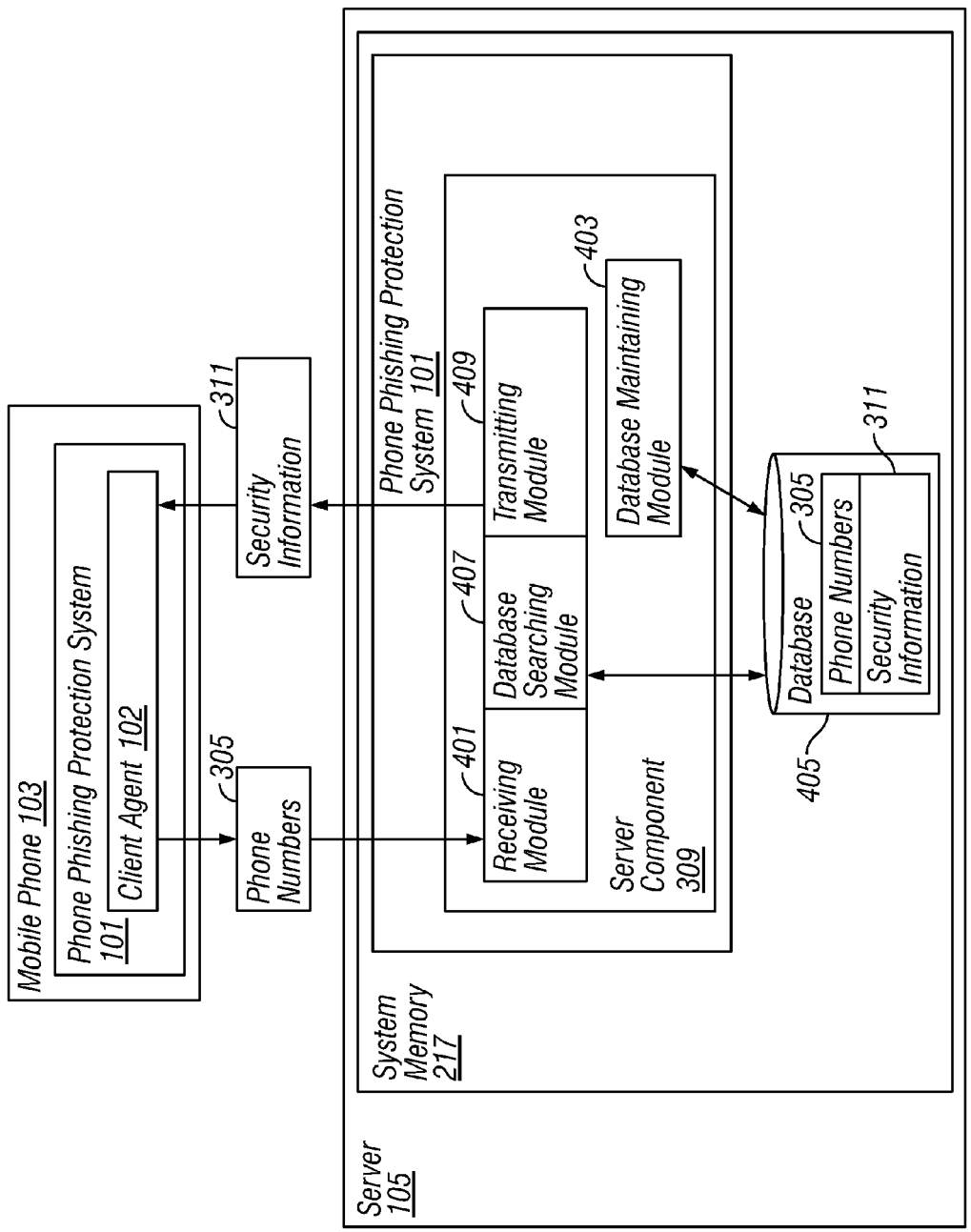
FIG. 4 is a block diagram of the operation of a server component of a phone phishing protection system, according to some embodiments.

FIG. 3 illustrates the operation of a client agent 102 of the phone phishing protection system 101, residing in the system memory 217 of a mobile phone 103 according to some embodiments. As described above, the functionalities of the phone phishing protection system 101 including those of the client agent 102 can reside on a mobile phone 103, a server 105, or be distributed between multiple computer systems 210, including within a cloud-based computing environment in which the functionality of the phone phishing protection system 101 is provided as a service over a network 107. It is to be understood that although the phone phishing protection system 101 is illustrated in FIGS. 3 and 4 as a single entity, the illustrated phone phishing protection system 101 represents a collection of functionalities, which can be instantiated as a single or multiple modules as desired (an instantiation of specific, multiple modules of the phone phishing protection system 101 is illustrated in FIGS. 3 and 4). It is to be understood that the modules of the phone phishing protection system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the phone phishing protection system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a client agent 102 of the phone phishing protection system 101 runs on a user's mobile phone 103, and protects the user against phone phishing. To do so, a detecting module 301 of the client agent 102 detects both incoming calls and text messages made to the mobile phone 103, and attempts by the mobile phone 103 to place outgoing calls or send text messages. In both cases, a number identifying module 303 of the client agent 102 identifies the phone number 305 from which the call or message is originating, or to which the attempted call or message is being placed. A transmitting module 307 of the client agent 102 transmits the phone number 305 to a server component 309 of the phone phishing protection system 101, running on, for example, a remote server 105 as illustrated. By using functionality described in detail below in conjunction with FIG. 4, the server component 309 determines whether the phone number 305 is being used for phone phishing or otherwise presents a potential security problem, and returns security information 311 concerning the phone number 305 to the client agent 102.

A receiving module 313 of the client agent 102 receives the security information 311 concerning the phone number 305 from the server component 309, and the client agent 102 proceeds accordingly. Security information 311 concerning a phone number 305, which indicates whether or not there is a potential security problem concerning the phone number 305 and if so why, is discussed in greater detail below in conjunction with FIG. 4. If the security information 311 indicates that the phone number 305 is safe to use, the client agent 102 allows the call or the message to be proceed normally. On the other hand, if the security information 311 indicates a potential security problem with the phone number 305, different actions can be taken. In one embodiment, where the security information 311 indicates that the phone number 305 is associated with phone phishing, a blocking module 315 of the client agent 102 blocks the call or message altogether. Other options are also possible, such as a warning module 317 of the client agent 102 displaying a security warning 319 to the user, and requesting confirmation to allow a call to proceed. Displayed security warnings 319 can contain as much detail concerning the potential security threat as desired. Other actions can include labeling a message as being suspicious, automatically sending incoming calls and/or messages from such numbers 305 to separate inboxes associated with suspicious messages, etc. In some embodiments, the action to take can depend upon configurable user preferences and/or the severity of the potential security problem activity associated with the phone number 305.

As illustrated in FIG. 4, the server component 309 of the phone phishing protection system 101 runs in the system memory 217 of a server computer 105. In other embodiments, the functionality of the server component 309 of the phone phishing protection system 101 is distributed between multiple computing systems 210. In any case, a receiving module 401 of the server component 309 receives phone numbers 305 to check for potential security problems from client agents 102 on mobile phones 103. Typically, a single server component 309 receives phone numbers 305 to check from a large plurality (not illustrated) of mobile phones 103.

A database maintaining module 403 of the server component 309 maintains a database 405 (or other suitable storage mechanism) containing telephone numbers 305 known to present a potential security concern, as well descriptive security information 311 concerning one or more potential security problems with each such telephone number 305. This security information 311 can indicate things such as a description of a phone phishing scheme in which the telephone number 305 is known to have been used, the low reputation of a business associated with the telephone number 305, the criminal record of an individual associated with the telephone number 305, etc. The identification of phone numbers 305 known to present a security concern for inclusion in the database 405 is discussed below.

When the receiving module 401 receives a phone number 305 to check from a client agent 102 on a mobile phone 103, a database searching module 407 of the server component 309 searches the database 405 for the phone number 305. If there is no entry in the database 405 for the phone number 305, then the phone number 305 is considered safe to use. In this case, a transmitting module 409 of the server component 309 transmits security information 311 to the client agent 102 indicating that there are no known security threats associated with the phone number 305. On the other hand, if the phone number 305 is listed in the database 405, then the phone number 305 is known to present a security concern, and the transmitting module 409 transmits the descriptive security information 311 concerning the phone number 305 from the database 405 to the client agent 102, for processing as described above in conjunction with FIG. 3.

The database maintaining module 403 can glean known phishing associated telephone numbers 305 and corresponding security information 311 from a variety of sources. For example, an anti-spam system 411 can identify phone numbers 305 used in known spam emails or instant messages, whereas a network security system 413 can identify phone numbers 305 listed on known phishing websites, websites known for disreputable business practices and other know malicious websites. Telephone numbers 305 that are the targets of mass callings or text messaging from a large plurality of mobile phones 103 can be identified as suspicious based on the associated requests received from a large plurality of client agents 102 deployed on mobile phones 103 in the field. Additionally, external blacklists of known bad phone numbers 305 can be acquired from third parties such as consumer protection organizations, security vendors, and law enforcement agencies.

Figure 5:
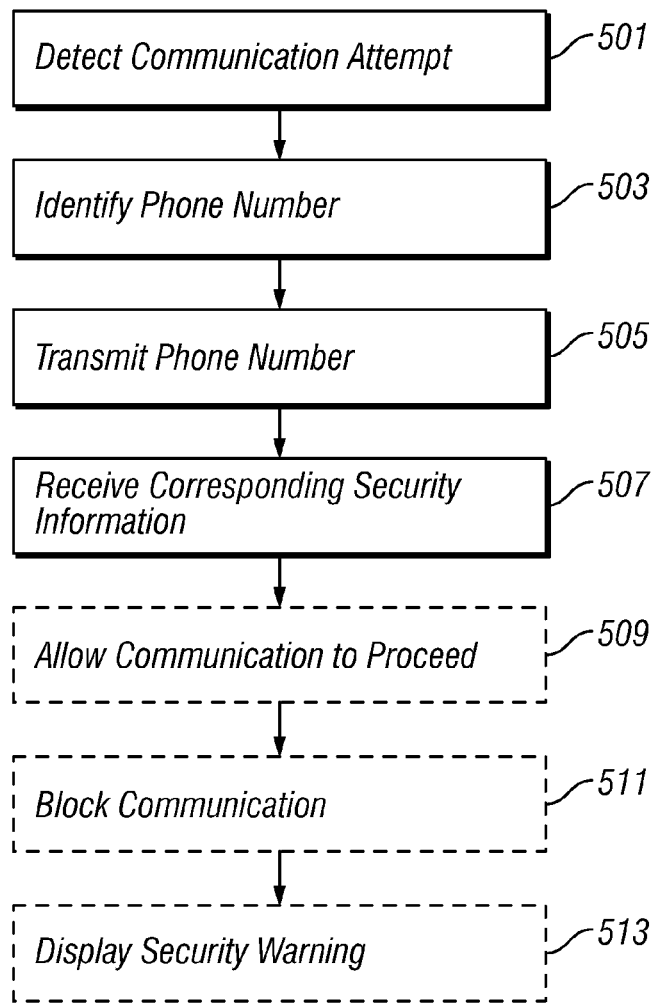
FIG. 5 is a flowchart of the mobile phone side operation of a phone phishing protection system, according to some embodiments.

FIG. 5 illustrates the mobile phone side operation of a phone phishing protection system 101 (FIG. 1), according to some embodiments. A detecting module 301 (FIG. 3) of the client agent 102 (FIG. 1) of the phone phishing protection system 101 (FIG. 1) detects 501 attempts by a mobile phone 103 (FIG. 1) to communicate telephonically. A phone number identifying module 303 (FIG. 3) of the client agent 102 (FIG. 1) identifies 503 the phone number 305 (FIG. 3) associated with the communication attempt. A transmitting module 307 (FIG. 3) of the client agent 102 (FIG. 1) transmits 505 the identified phone number 305 (FIG. 3) to a server component 309 (FIG. 3) of the phone phishing protection system 101 (FIG. 1) in order to glean corresponding security information 311 (FIG. 3). Responsive to the transmission, a receiving module 313 (FIG. 3) of the client agent 102 (FIG. 1) receives 507 security information 311 (FIG. 3) concerning the identified telephone number (FIG. 3). Responsive to the contents of the received security information 311 (FIG. 3), the detected attempt to communicate telephonically is further processed. More specifically, where the received security information 311 (FIG. 3) indicates that there are no known security threats associated with the identified telephone number 305 (FIG. 3), the client agent 102 (FIG. 1) allows 509 the detected attempt to communicate telephonically to proceed. Where the received security information 311 (FIG. 3) describes at least one potential security threat associated with the telephone number 305 (FIG. 3), a blocking module 315 (FIG. 3) of the client agent 102 (FIG. 1) can block 511 the attempt to communicate, or a warning module 317 (FIG. 3) of the client agent 102 (FIG. 1) can display 513 a security warning 319 (FIG. 3).

Figure 6:
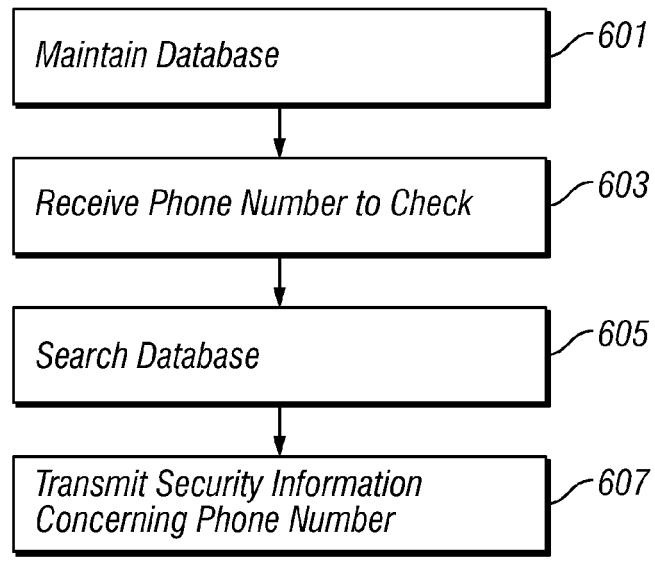
FIG. 6 is a flowchart of the server side operation of a phone phishing protection system, according to some embodiments.

FIG. 6 illustrates the server side operation of a phone phishing protection system 101 (FIG. 1), according to some embodiments. A database maintaining module 403 (FIG. 4) of the server component 309 (FIG. 3) of the phone phishing protection system 101 (FIG. 1) maintains 601 a database 405

(FIG. 4) containing 1) phone numbers 305 (FIG. 3) known to present potential security concerns and 2) descriptive security information 311 (FIG. 3) concerning each of these phone numbers 305 (FIG. 3). A receiving module 401 (FIG. 4) of the server component 309 (FIG. 3) receives 603 phone numbers 305 (FIG. 3) from mobile phones 103 (FIG. 1) to check for security information 311 (FIG. 3). In responsive, a database searching module 407 (FIG. 4) of the server component 309 (FIG. 3) searches 605 the database 405 (FIG. 4) for received phone numbers 305 (FIG. 3) and corresponding security information 311 (FIG. 3). A transmitting module 409 (FIG. 4) of the server component 309 (FIG. 3) transmits 607 security information 311 (FIG. 3) concerning the phone numbers 305 (FIG. 3) to the mobile phones 103 (FIG. 1). More specifically, where a specific phone number 305 (FIG. 3) is not found in the database 405 (FIG. 4), the transmitting module 409 (FIG. 4) transmits 607 security information 311 (FIG. 3) indicating that there are no known security threats associated with the specific phone number 305 (FIG. 3). Where a specific phone number 305 (FIG. 3) is found in the database 405 (FIG. 4), the transmitting module 409 (FIG. 4) transmits 607 descriptive security information 311 (FIG. 3) concerning the specific phone number 305 (FIG. 3) from the database 405 (FIG. 4).

As will be understood by those familiar with the art, the invention may be embodied in other specific forms without departing from the spirit or essential characteristics thereof. Likewise, the particular naming and division of the portions, modules, agents, managers components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting mobile users from telephone phishing, the method comprising the steps of:
    detecting, by a mobile phone, an attempt to communicate telephonically;
    identifying, by the mobile phone, a phone number associated with the detected attempt to communicate telephonically;
    transmitting, by the mobile phone, the identified phone number to a remote computing device in order to glean security information concerning whether the identified telephone number is from a list of unallowable numbers that is automatically gathered from a plurality of independent data sources;
    receiving, by the mobile phone, automatically gathered security information concerning whether the identified telephone number is from the list of unallowable phone numbers from the remote computing device; and
    responsive to the received automatically gathered security information from the remote computing device, processing, by the mobile phone, the detected attempt to communicate telephonically.

2. The method of claim 1 further comprising:
    maintaining, by at least one server computer, 1) a database of phone numbers known to present potential security concerns and 2) descriptive automatically gathered security information concerning each said phone number;
    receiving, by the at least one server computer, at least one phone number being used by at least one mobile phone;
    responsive to receiving a specific phone number being used by a specific mobile phone, searching the database, by the at least one server computer, for the specific phone number; and
    transmitting, by the at least one server computer, security information to the specific mobile phone by which the specific phone number is being used.

3. The method of claim 2 wherein transmitting, by the at least one server computer, automatically gathered security information to the specific mobile phone by which the specific phone number is being used further comprises:
    responsive to not finding the specific phone number in the database, transmitting, by the at least one server computer, automatically gathered security information to the specific mobile phone indicating that there are no known security threats associated with the specific phone number.

4. The method of claim 2 wherein transmitting, by the at least one server computer, automatically gathered security information to the specific mobile phone by which the specific phone number is being used further comprises:
    responsive to finding the specific phone number in the database, transmitting, by the at least one server computer, the descriptive automatically gathered security information concerning the specific phone number from the database to the specific mobile phone.

5. The method of claim 1 wherein detecting, by the mobile phone, an attempt to communicate telephonically further comprises a step from a group of steps consisting of:
    detecting, by the mobile phone, an incoming telephone call, from a specific originating phone number; and
    detecting, by the mobile phone, an incoming text message, from a specific originating phone number.

6. The method of claim 1 wherein detecting, by the mobile phone, an attempt to communicate telephonically further comprises a step from a group of steps consisting of:
    detecting, by the mobile phone, an attempt to place an outgoing telephone call, to a specific target phone number; and
    detecting, by the mobile phone, an attempt to send an outgoing text message, to a specific target phone number.

7. The method of claim 1 further comprising:
    responsive to receiving automatically gathered security information indicating that there are no known security threats associated with the identified telephone number from the remote computing device, allowing, by the mobile phone, the detected attempt to communicate telephonically to proceed.

8. The method of claim 1 further comprising:
    responsive to receiving automatically gathered security information describing at least one potential security concern associated with the identified telephone number from the remote computing device, blocking, by the mobile phone, the detected attempt to communicate telephonically.

9. The method of claim 1 further comprising:
    responsive to receiving security information describing at least one potential security concern associated with the identified telephone number from the remote computing device, displaying, by the mobile phone, a security warning concerning the at least one potential security concern associated with the identified telephone number.

10. The method of claim 9 further comprising performing a step from a group of steps consisting of:
responsive to receiving user input acknowledging the display of the security warning and directing the mobile phone to proceed with the attempt to communicate telephonically, allowing, by the mobile phone, the detected attempt to communicate telephonically to proceed; and
responsive to receiving user input acknowledging the display of the security warning and directing the mobile phone not to proceed with the attempt to communicate telephonically, blocking, by the mobile phone, the detected attempt to communicate telephonically.

11. At least one non-transitory computer readable storage medium storing a computer program product for protecting mobile users from telephone phishing, the computer program product comprising:
program code for detecting, by a mobile phone, an attempt to communicate telephonically;
program code for identifying, by the mobile phone, a phone number associated with the detected attempt to communicate telephonically;
program code for transmitting, by the mobile phone, the identified phone number to a remote computing device in order to glean security information concerning whether the identified telephone number is from a list of unallowable numbers that is automatically gathered from a plurality of independent data sources;
program code for receiving, by the mobile phone, automatically gathered security information concerning whether the identified telephone number is from the list of unallowable phone numbers from the remote computing device; and
program code for, responsive to the received automatically gathered security information from the remote computing device, processing, by the mobile phone, the detected attempt to communicate telephonically.

12. The computer program product of claim 11 further comprising:
program code for maintaining, by at least one server computer, 1) a database of phone numbers known to present potential security concerns and 2) descriptive automatically gathered security information concerning each said phone number;
program code for receiving, by the at least one server computer, at least one phone number being used by at least one mobile phone;
program code for, responsive to receiving a specific phone number being used by a specific mobile phone, searching the database, by the at least one server computer, for the specific phone number; and
program code for transmitting, by the at least one server computer, automatically gathered security information to the specific mobile phone by which the specific phone number is being used.

13. The computer program product of claim 12 wherein the program code for transmitting, by the at least one server computer, automatically gathered security information to the specific mobile phone by which the specific phone number is being used further comprises:
program code for, responsive to not finding the specific phone number in the database, transmitting, by the at least one server computer, automatically gathered security information to the specific mobile phone indicating that there are no known security threats associated with the specific phone number.

14. The computer program product of claim 12 wherein the program code for transmitting, by the at least one server computer, automatically gathered security information to the specific mobile phone by which the specific phone number is being used further comprises:
program code for, responsive to finding the specific phone number in the database, transmitting, by the at least one server computer, the descriptive automatically gathered security information concerning the specific phone number from the database to the specific mobile phone.

15. The computer program product of claim 11 wherein the program code for detecting, by the mobile phone, an attempt to communicate telephonically further comprises program code for performing at least one step from a group of steps consisting of:
detecting, by the mobile phone, an incoming telephone call, from a specific originating phone number; and
detecting, by the mobile phone, an incoming text message, from a specific originating phone number.

16. The computer program product of claim 11 wherein the program code for detecting, by the mobile phone, an attempt to communicate telephonically further comprises program code for performing at least one step from a group of steps consisting of:
detecting, by the mobile phone, an attempt to place an outgoing telephone call, to a specific target phone number; and
detecting, by the mobile phone, an attempt to send an outgoing text message, to a specific target phone number.

17. The computer program product of claim 11 further comprising:
program code for, responsive to receiving automatically gathered security information indicating that there are no known security threats associated with the identified telephone number from the remote computing device, allowing, by the mobile phone, the detected attempt to communicate telephonically to proceed.

18. The computer program product of claim 11 further comprising:
program code for, responsive to receiving automatically gathered security information describing at least one potential security concern associated with the identified telephone number from the remote computing device, blocking, by the mobile phone, the detected attempt to communicate telephonically.

19. The computer program product of claim 11 further comprising:
program code for, responsive to receiving automatically gathered security information describing at least one potential security concern associated with the identified telephone number from the remote computing device, displaying, by the mobile phone, a security warning concerning the at least one potential security concern associated with the identified telephone number; and
program code for performing at least one step from a group of steps consisting of:
responsive to receiving user input acknowledging the display of the security warning and directing the mobile phone to proceed with the attempt to communicate telephonically, allowing, by the mobile phone, the detected attempt to communicate telephonically to proceed; and
responsive to receiving user input acknowledging the display of the security warning and directing the mobile phone not to proceed with the attempt to communicate telephonically, blocking, by the mobile phone, the detected attempt to communicate telephonically.

20. A computer system for protecting mobile users from telephone phishing, the computer system comprising:
- at least one processor;
- system memory;
- a detecting module to detect an attempt to communicate telephonically;
- a number identifying module to identify a phone number associated with the detected attempt to communicate telephonically;
- a transmitting module to transmit the identified phone number to a remote computing device in order to glean security information concerning whether the identified telephone number is from a list of unallowable numbers that is automatically gathered from a plurality of independent data sources;
- a receiving module to receive automatically gathered security information concerning whether the identified telephone number is from a list of unallowable numbers that is automatically gathered from the remote computing device; and
- responsive to the received automatically gathered security information from the remote computing device, a blocking module to process, the detected attempt to communicate telephonically.

* * * * *